3,340,080
PRODUCTION OF OIL-IMPREGNATED
CARBON BLACK
Eulas W. Henderson, Borger, Tex., assignor to Phillips
Petroleum Company, a corporation of Delaware
Filed June 1, 1964, Ser. No. 371,336
7 Claims. (Cl. 106—307)

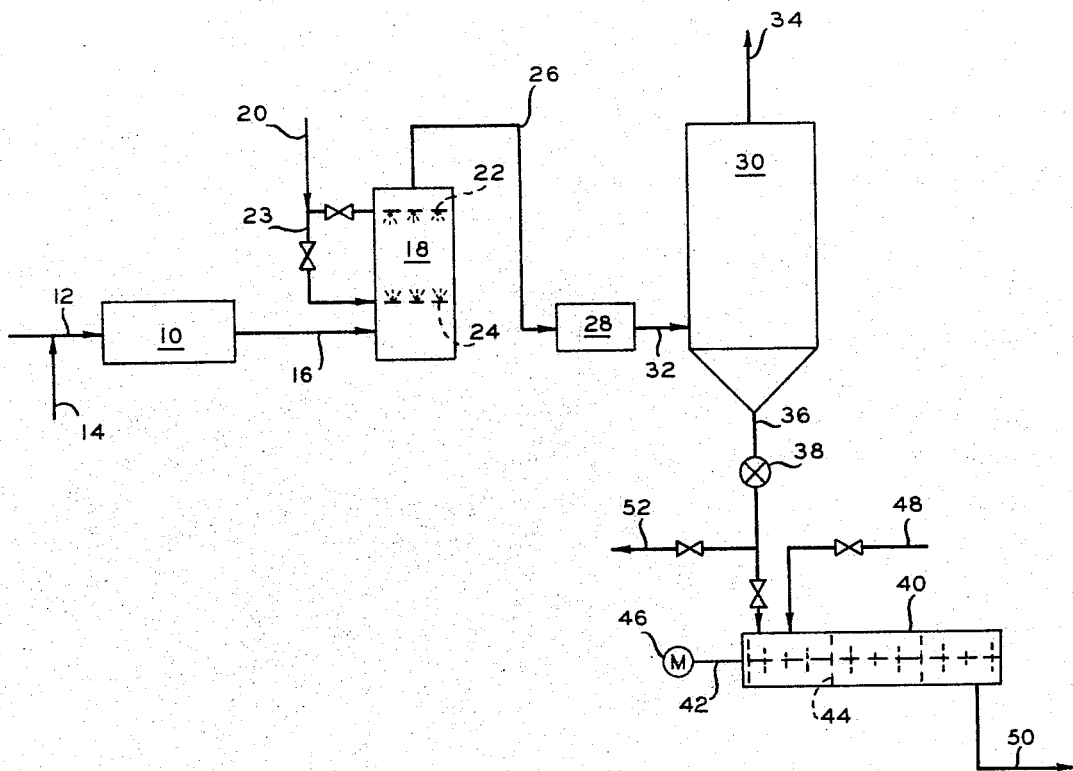

This invention relates to a process and apparatus for the production of low structure oil-impregnated carbon black. Another aspect of the invention is concerned with the production of oiled carbon black pellets and apparatus therefor.

It is conventional practice in the carbon black art to incorporate oil in carbon black pellets. Processes and apparatus for oiling carbon black pellets are disclosed in U.S. Patent 2,813,040, issued Nov. 12, 1957, to Rowe et al. and in U.S. Patent 2,699,381, issued Jan. 11, 1955, to W. R. King. Carbon black particles coated or impregnated with oil are more readily dispersed in solvents than pellets containing no oil. Oiled carbon black particles are advantageous in the manufacture of rubber-black-oil masterbatches because of the good dispersion of the black in the masterbatch.

It is an object of the invention to provide a process and apparatus for oil impregnating carbon black particles in the smoke from a carbon black furnace. Another object is to provide a process and apparatus for producing oiled pellets of carbon black. A further object is to provide a process and apparatus for facilitating the oil pelleting of carbon black particles. It is also an object of the invention to produce low structure carbon black particles impregnated with oil. A still further object is to utilize the latent heat in a carbon black reactor effluent for cracking of oil to produce additional carbon black. Other objects of the invention will become apparent to those skilled in the art upon consideration of the accompanying disclosure.

A broad aspect of the invention comprises quenching the hot smoke stream from a carbon black reactor substantially at effluent temperature with finely dispersed oil so as to crack a substantial proportion of the oil to carbon and provide a substantial proportion of uncracked oil for incorporation in the carbon black particles in the smoke stream. The rate of injection per quantity of oil injected is regulated so as to substantially reduce the smoke temperature such as to the range of 400 to 2250° F. Preferably, the temperature and quantity of the oil are controlled to reduce the temperature of the quenched smoke to the range of 2000 to 2250° F. and further cooling thereof is effected before passing the quenched smoke to a conventional bag filter unit for recovery of the oiled carbon black particles. The quench oil may be injected directly into the downstream end of the reactor in lieu of conventional water quench. Oil quench may be followed immediately with water quench.

In one embodiment of the invention, however, the reactor smoke is quenched to a temperature in the range of 400 to 550° F. and the quenched smoke requires no further cooling before passing same to a bag filter for recovery of oil-containing carbon black. It is to be understood that other separators such as a cyclone separator or an electrode precipitator may be utilized in lieu of a bag filter although the bag filter type separator is preferred. The oiled particles of carbon black recovered from the bag filter are then pelleted with or without additional fluid pelleting medium such as additional oil.

The pelleting is effected in any suitable type of pelleting equipment such as a wet mixer in the form of a pug mill, a dry pellet mill, or a fluidized bed pelleter. In some applications in which the carbon black plant and the rubber plant are closely associated, the oiled carbon black particles may be transported directly from the bag filter to the rubber plant without pelleting.

The oil utilized in the process may be the same type of oil introduced to the carbon black reactor. Oils of this type have a substantial concentration of aromatics therein. The oil may be any suitable oil known as an extender oil which is commonly added to carbon black before addition to a rubber masterbatch to facilitate the dispersion of the black in the masterbatch. Typical extender oils are "Philrich 5" and "Circosol 2XH."

A more complete understanding of the invention may be had by reference to the accompanying schematic drawing which is a flow illustrating an arrangement of apparatus for performing the invention.

Referring to the drawing, the carbon black reactor 10 is supplied with a hydrocarbon feed thru line 12 and air thru line 14 to produce carbon black in the reactor under incomplete combustion conditions conventional in the art at a temperature of about 2400° F. The hot smoke effluent substantially at reactor temperature is passed thru line 16 to a quench tank 18 for quenching with oil introduced thru line 20. All of the oil may be sprayed in a fine spray downwardly into the upflowing smoke thru sprays 22 or it may all be injected thru line 23, attaching to line 20, and sprayed upwardly thru sprays 24 into the ascending stream of smoke. It is also feasible to inject a portion of the oil thru each spray system.

The rate of oil injection and dispersion into the smoke in vessel 18 is controlled to provide an outlet smoke temperature in line 26 in the range of about 400 to 2250° F. and, preferably, to a higher temperature in this range. When the temperature of the smoke in line 26 is above the range of 400 to 550° F., it is necessary to cool the quenched smoke to a temperature in this range before passing the same to the downstream bag filter. Cooler 28 is positioned in smoke line 26 just upstream of bag filter 30 and is connected thereto by means of line 32. Cooler 28 represents either an indirect heat exchanger or a direct heat exchanger into which a fluid coolant such as water or additional oil is injected to regulate the temperature of the smoke in line 32 passing to the bag filter.

Bag filter 30 is a conventional bag filter unit which separates the carbon black particles from the smoke, passing the denuded smoke thru stack 34 and dropping the recovered oiled carbon black particles into the bottom of the unit. The black descends thru line 36 under the control of feeder or star valve 38 to pellet mill 40 which is a pug mill type pelleter with an axial shaft 42 provided with radial pins 44, the shaft being rotated by an electric motor 46. Line 48 is provided for introducing oil or other liquid pelleting agent in instances in which such is desired. Effluent oiled pellets are passed thru line 50 to packaging or other disposal. Line 52 provides for recovery of the oiled carbon black particles in instances in which the pelleting of the oiled particles is not desired.

The amount of oil introduced to the downstream end of the reactor or to quench tank 18 is sufficient to adequately quench the smoke to the desired temperature and to provide a substantial proportion of uncracked oil which either deposits on the carbon black particles in the smoke in the quench tank or downstream of the tank as in cooler 28. The amount of oil injected into the quench tank may be as high as 2 pounds of oil for each pound of dry black in the smoke stream. The temperature of the quench oil introduced to tank 18 is controlled in the range of about 100 to 1000° F. It is feasible to introduce the oil in vapor form, in liquid form, or as a mixture of vapor and liquid. When injecting the oil in vapor form it is preferably to inject same thru sprays 24.

The cracking of a substantial proportion of the quench oil in the absence of free oxygen under non-combustion conditions produces thermal black which blends with the primary black stream and effects a lowering of the black structure of the whole stream. The incorporation of uncracked oil in the black particles effects some densification of the black and thus makes recovery and pelleting considerably easier.

In order to illustrate the invention without unduly limiting the same, the examples below are presented.

In each example, axial oil feed, designated B271 oil (defined below), at a temperature of about 775° F. is passed at the rate of about 220 g.p.h. to a reactor having an expanded preheating section to which tangential air and fuel gas are passed at temperatures of about 80° F. and at an air flow rate of about 140,000 s.c.f.h. and a gas flow rate of about 8666 s.c.f.h. Temperature in the reaction zone is about 2400° F.

EXAMPLE I

The reactor effluent (smoke) at 2400° F. is quenched with "Philrich 5" oil (defined below) by injecting 61 g.p.h. into the effluent in the downstream end of the reactor, bringing its temperature down to about 2150° F. A water-quench downstream of the oil-quench reduces the smoke temperature to about 1200° F. after which its temperature is further reduced to about 500° F. before passing thru a bag filter collection system to recover the carbon black.

In this operation about 10 percent of the rubber extender oil ("Philrich 5") is cracked and the remainder is absorbed on the carbon black. The recovered product contains about 2 pounds of black for each pound of oil and is about 33.4 percent oil. The rate of production is about 916#/hr. of black and 458#/hr. of oil.

EXAMPLE 2

The smoke from the reactor is quenched from a temperature of about 2400° F. to 2250° F. by injecting 15 g.p.h. of B271 oil (same as axial oil feed) into the downstream end of the reactor. An immediate water-quench brings the temperature down to about 1200° F. and cooling to about 500° F. is effected before passing the smoke thru the bag filter collection system. The recovered black comprises about 916#/hr. having 1.35 cc./g. oil absorption value produced from axial oil and about 84#/hr. having 0.40 cc./g. oil absorption value produced from the quench oil. The total product (1000#/hr.) has an oil absorption value of 1.27 cc./g. and contains about 2 percent by weight of oil.

Yield of black from quench oil is 75 percent of theoretical or 5.66#/gal. The yield from axial oil is 4.16#/gal. The overall yield is 4.26#/gal. The product black has a surface area of about 75 m.²/g.

The oil analyses are presented below:

B271 oil

ASTM vacuum distillation, 760 mm.:
 Percent—
  2 _____°F__ 571
  5 _____°F__ 599
  10 _____°F__ 618
  20 _____°F__ 636
  30 _____°F__ 659
  40 _____°F__ 676
  50 _____°F__ 691
  60 _____°F__ 715
  70 _____°F__ 735
  80 _____°F__ 770
  90 _____°F__ 827
  95 _____°F__ 889
K factor _____ 10.5
API gravity, 60° F. _____ 10.7
BMCI _____ 88
Viscosity:
 SUS 100° F. _____ 70.3
 SUS 210° F. _____ 35.4
Carbon, wt. percent _____ 89.3
Hydrogen, wt. percent _____ 9.4
Sulfur, wt. percent _____ 1.1
Ramsbottom carbon residue, wt. percent _ 0.91
BS & W, vol. percent _____ 0.5
Pentane insoluble, wt. percent _____ 0.27
Pour point, °F. _____ +36
Ash, wt. percent _____ 0.0024

"Philrich 5"

API gravity, 60° F. _____ 11
Flash point, °F. _____ 465
Fire point, °F. _____ 525
Viscosity, SUS @ 210° F. _____ 170
Pour point, °F. _____ +5
Aniline point _____ 115

ASTM vacuum distillation, 760 mm.:
 Percent—
  10 _____°F__ 872
  50 _____°F__ 934
  90 _____°F__ 1016

Certain modifications of the invention will become apparent to those skilled in the art and the illustrative details disclosed are not to be construed as imposing unnecessary limitations on the invention.

I claim:

1. A process for producing oiled carbon black particles from a hot effluent smoke stream from a carbon black reactor or furnace at a temperature of at least 2400° F., which comprises the steps of:

(1) quenching said smoke substantially at effluent temperature by injecting into the smoke stream a quenching fluid comprising a substantial proportion of oil so as to crack a portion of said oil to form additional carbon black, lower the temperature of said stream substantially, and incorporate a substantial concentration of uncracked oil in the carbon black therein;

(2) passing the effluent stream from step (1) at a temperature in the range of about 400° to 550° F. thru a separation zone and recovering the oil-containing carbon black particles from said stream therein.

2. The process of claim 1 wherein the quench temperature in step (1) is in the range of 400° to 2250° F.

3. The process of claim 1 wherein the quench temperature in step (1) is substantially higher than 550° F. and the effluent from step (1) is passed thru a cooling zone to cool same before passing the cooled stream to step (2).

4. The process of claim 1 including the step of pelleting the oiled carbon black particles from step (2).

5. The process of claim 4 wherein additional oil is incorporated into the carbon black during pelleting.

6. The process of claim 1 wherein the quantity of oil injected in the quench produces a concentration of oil in the recovered black in the range of 0.0525 to 1 pound per pound of black.

7. The process of claim 1 wherein the concentration of oil in the black particles incorporated therein in step (1) is in the range of 0.5 to 1 pound of oil per pound of black and the oiled black is pelleted without additional pelleting liquid.

References Cited
UNITED STATES PATENTS

| | | | |
|---|---|---|---|
| 2,585,659 | 2/1952 | Kilpatrick | 23—209.9 |
| 2,657,117 | 10/1953 | Sperberg | 23—209.9 |
| 2,735,828 | 2/1956 | Wood | 23—209.9 |
| 2,886,567 | 5/1959 | Wood | 23—209.4 |
| 3,011,902 | 12/1961 | Jordan | 23—314 |
| 3,075,829 | 1/1963 | Latham et al. | 23—209.4 |
| 3,282,719 | 11/1966 | Voet | 23—314 |
| 3,294,567 | 12/1966 | Dobbin et al. | 23—314 |

TOBIAS E. LEVOW, *Primary Examiner.*

S. E. MOTT, *Assistant Examiner.*